United States Patent [19]

Saurenbach et al.

[11] Patent Number: 5,701,381
[45] Date of Patent: Dec. 23, 1997

[54] MOUNTING ARRANGEMENT FOR A PROBE TIP OF A SCANNING FORCE OR TUNNELING MICROSCOPE

[75] Inventors: Frank Saurenbach, Herzogenrath; Hans-Achim Fuss, Jülich, both of Germany

[73] Assignee: Forschungszentrum Jülich GmbH, Jülich, Germany

[21] Appl. No.: 641,638

[22] Filed: May 2, 1996

Related U.S. Application Data

[63] Continuation-in-part of PCT/DE94/01334, Nov. 9, 1994.

[30] Foreign Application Priority Data

Nov. 12, 1993 [DE] Germany .................. 43 38 688.1

[51] Int. Cl.⁶ .................................................. C02B 6/36
[52] U.S. Cl. .......................... 385/139; 385/78; 385/147
[58] Field of Search ........................... 250/234, 306, 250/307; 385/78–84, 137, 138, 139, 147

[56] References Cited

U.S. PATENT DOCUMENTS

| | | | |
|---|---|---|---|
| 5,138,159 | 8/1992 | Takase et al. | 250/306 |
| 5,559,330 | 9/1996 | Murashita | 250/306 |

FOREIGN PATENT DOCUMENTS

| | | |
|---|---|---|
| A05141961 | 6/1993 | Japan. |
| A00180222 | 7/1994 | Japan. |

OTHER PUBLICATIONS

Review of Scientific Instruments vol. 62 No. 5, May 91, New York pp. 1280–1284 P.J. Mulhern et al. "A Scaning Force Microscope with a fiber-optic inf. displ. sensor".

IBM Techn. Disch. Bulletin vol. 31, No. 9, Feb. 89 New York p. 216 "Tip Rev. Tunnel. Mic.".

Measurement and Science Technology vol. 4, No. 7, Jul. 93, Bristol GB pp. 769–775, A. Moser et al, "A miniature fibre optic force microscope scan head".

*Primary Examiner*—John Ngo
*Attorney, Agent, or Firm*—Klaus J. Bach

[57] ABSTRACT

In a support arrangement for a probe tip of a scanning force microscope or a SNOM wherein the movement of the probe tip while scanning a sample surface is interferometrically determined and wherein a ferrule mounted on a ferrule holder includes an optical light conductor with an end projecting from the ferrule and having an end face, the probe tip is supported by a mounting means which can be slipped onto the ferrule into a predetermined position in which the probe tip is disposed in front of the light conductor end face with a given gap therebetween.

7 Claims, 3 Drawing Sheets

MOUNTING ARRANGEMENT FOR A PROBE TIP OF A SCANNING FORCE OR TUNNELING MICROSCOPE

This is a continuation-in-part application of international application PCT/DE94/01334 filed 09 Nov. 1994 and claiming the priority of German application P 43 38 688.1 filed 12 Nov. 1993.

BACKGROUND OF THE INVENTION

The invention relates to a mounting arrangement for a probe tip of a scanning probe microscope, a scanning force or Scanning Nearfield Optical Microscope (SNOM), for scanning a sample surface for its topography, but especially to determine the van der Waals magnetic or electrostatic forces on the sample surface. The movement of the probe tip is determined by interferometric means. For this purpose, at least one light beam guide is employed which has a light beam exit area arranged at a given location at a small distance from, and opposite, the probe tip which moves relative to the light beam exit area in such a way that the interference between light reflected at the light beam exit area and light reflected from the probe tip can be measured by means of an interferometer.

Scanning probe microscopes require probe tips of high quality for performing accurate measurements. It is therefore necessary to replace the probe tip frequently. A replacement of the probe tip however is quite involved as it requires readjustment of the detection system.

An arrangement for facilitating the replacement of a probe tip of a scanning tunneling microscope is shown for example in the IBM Technical Disclosure Bulletin 31 No. 9, Feb. 1989, New York, page 218, under the title "TIP REVOLVER FOR SCANNING TUNNELING MICROSCOPE".

For interferometric measurements, the probe tip has to be positioned at a distance from the light beam exit area of the light conductor of some 10 μm in order to obtain a reflection signal which is essentially unaffected by scattered light. For fine-adjustment, mechanical or piezoelectric positioning elements are used; the adjustment is performed under the microscope.

It is the object of the present invention to facilitate the adjustment of the probe tip and the light conductor and to simplify the replacement of the probe tip.

SUMMARY OF THE INVENTION

In a support arrangement for a probe tip of a scanning force or SNOM microscope wherein the movement of the probe tip while scanning a sample surface is inferometrically determined and wherein a ferrule mounted on a ferrule holder includes an optical light conductor with an end projecting from the ferrule and having an end face, the probe tip is supported by a mounting means which can be slipped onto the ferrule into a predetermined position in which the probe tip is disposed in front of the light conductor end face with a given gap therebetween.

Ferrules are known from glass fiber cable installation techniques. They are accurately manufactured ceramic parts and include slotted ceramic tubes serving as mounting guides for two ceramic cores which are insertable into the ceramic tube from opposite ends thereof. The glass fiber ends are positioned thereby in accurate alignment at a distance of 1 μm from each other so that the light is coupled, with high accuracy, from one glass conductor into the other. The present invention utilizes of this known light conductor coupling arrangement e. g. a slotted ceramic tube and one ceramic core on which the light conductor is mounted. The ceramic tube is fastened to the mounting structure for the probe tip and accommodates the ceramic ferrule which receives the light conductor. When mounting the probe tip holder onto the ferrule, the probe tip mounting structure is arranged on the scanning probe microscope and is firmly engaged with the ceramic ferrule in a predetermined position, wherein the probe tip is located, with an accuracy of 1 μm, at the desired distance from the light beam-reflecting end face of the light conductor. An adjustment of the light conductor with respect to the probe tip of the scanning probe microscope is not necessary.

In a further embodiment of the invention a plug-in coupling structure is provided for mounting the probe tip onto the ferrule. The plug-in coupling structure facilitates the replacement procedure, particularly if force-locked coupling elements are used. Preferred is a tubular coupling element which is slotted in axial direction and can be clamped onto the ferrule. For measuring movement of the ferrule by distances in the μm range, the ferrule is provided with a tubular piezo electric scanning element.

Below, an embodiment of the invention will be described in greater detail on the basis of schematic drawings.

DESCRIPTION OF A PREFERRED EMBODIMENT

Figure 1:
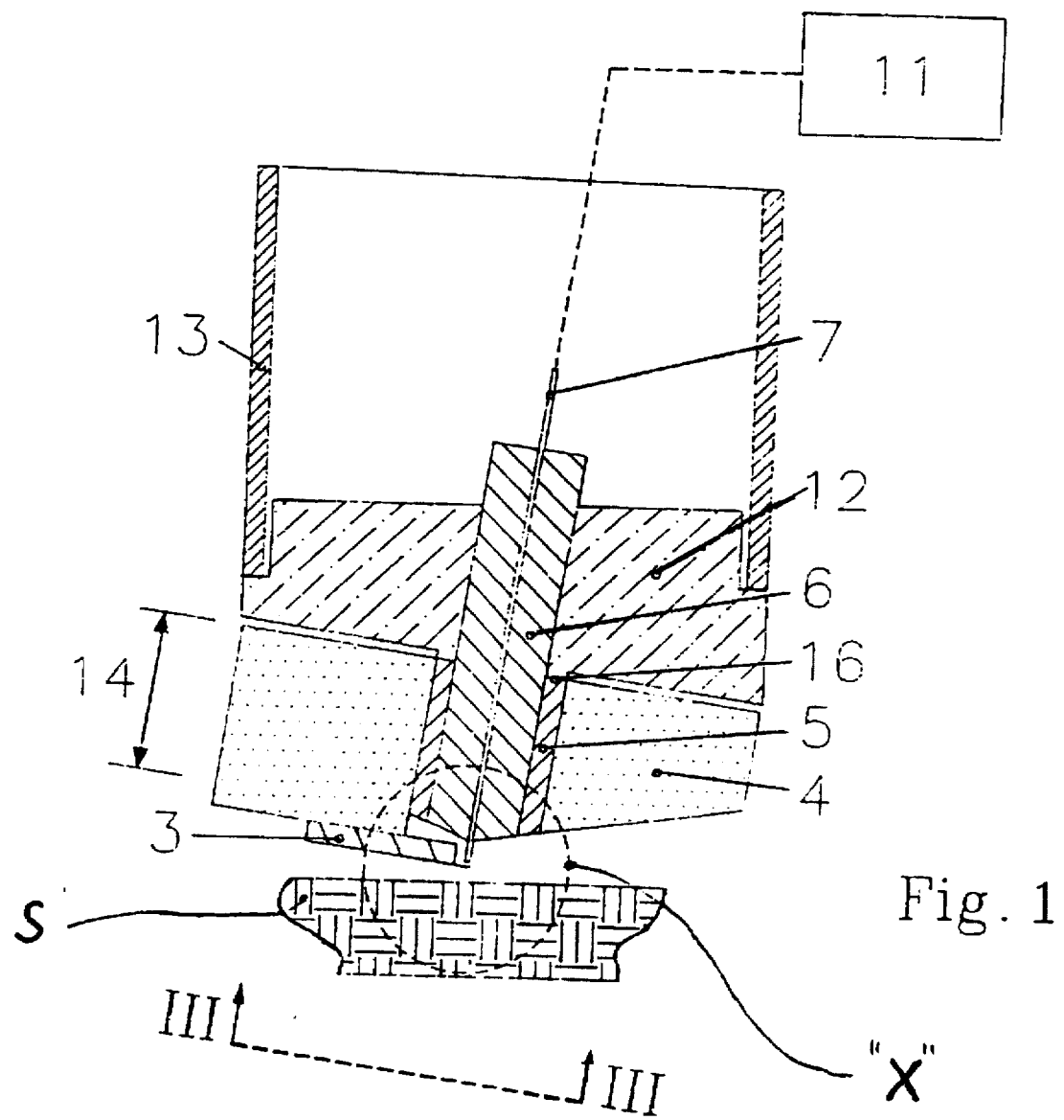
FIG. 1 is a longitudinal cross-sectional view taken along line I—I of FIG. 3 of a mounting arrangement for a probe tip connected to a piezo-electric scanning element.

The figures show a mounting arrangement for a probe tip 1 of a scanning force microscope. FIG. 1 shows the arrangement in a longitudinal cross-sectional view, the probe tip area enclosed by the dashed circle "X" being shown enlarged in FIG. 2. The probe tip 1 is disposed on a probe tip holder 2 which is part of a mounting member 3, the mounting member 3 being connected to a plug-in mounting structure 4. The plug-in mounting structure 4 includes a coupling element 5 which can be slipped onto a ferrule 8 which includes a glass fiber 7 serving as a light beam conductor. The tip holder 2 with the probe tip 1, the mounting member 3 and the plug-in structure 4 with the coupling element 5 are firmly interconnected so as to form an integral mounting unit.

Figure 2:
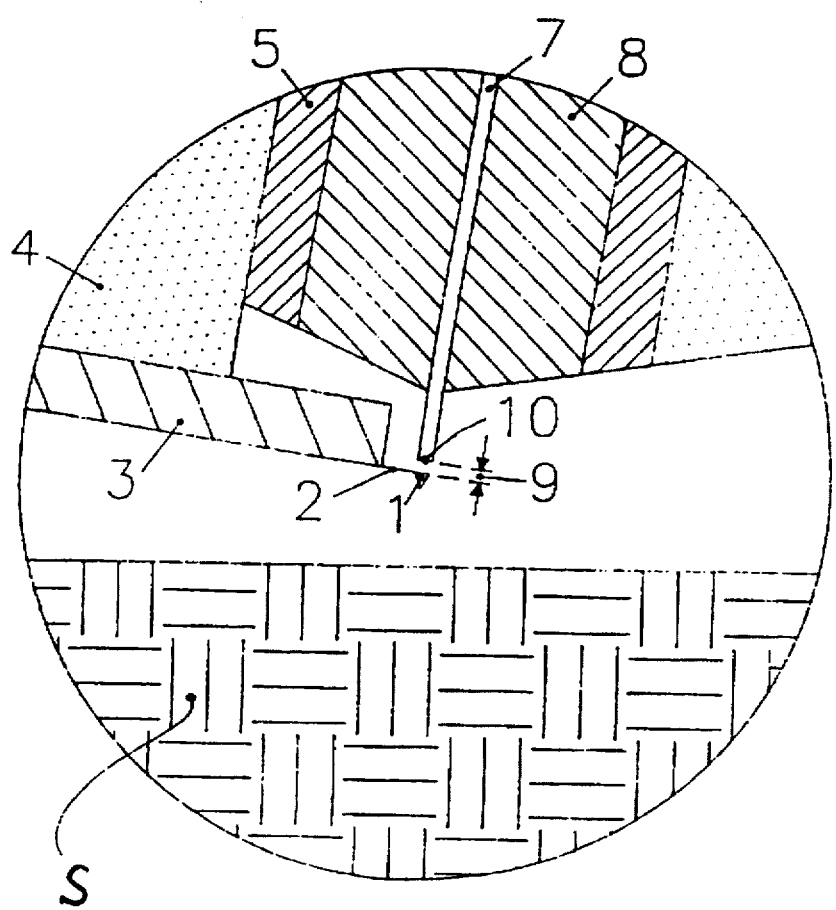
FIG. 2 is an enlarged representation of the section enclosed by the circle "X" of FIG. 1.
Figure 3:
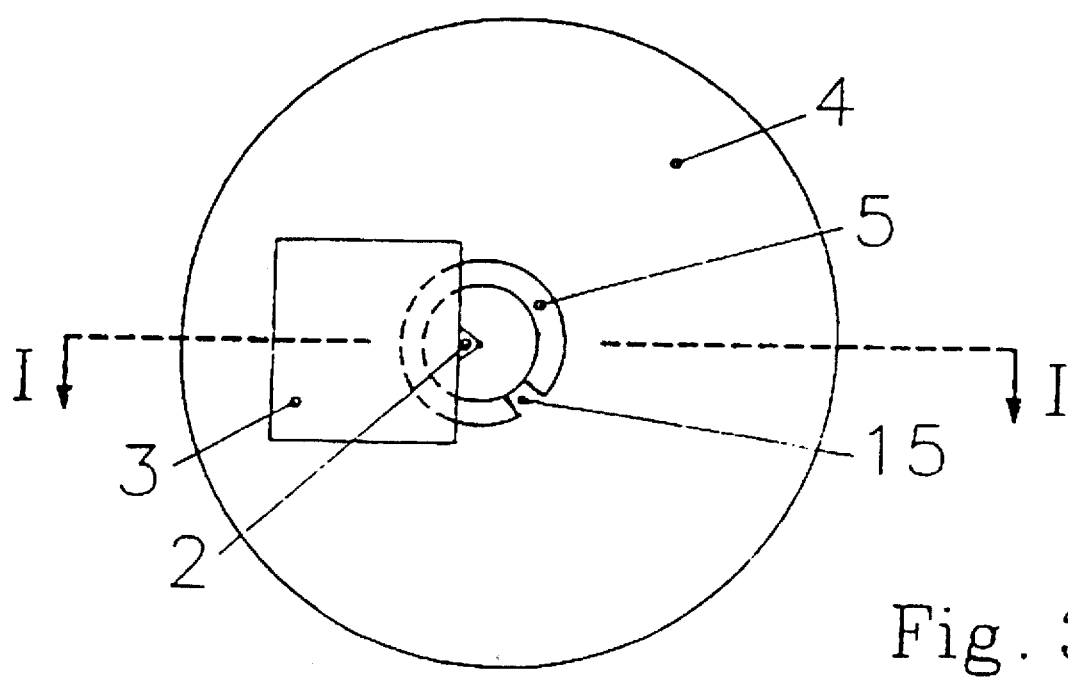
FIG. 3 is plain view of the support arrangement for the probe tip (without the probe) taken from line III—III of FIG. 1.

The glass fiber 7 is centrally mounted within the ferrule 6. It extends up to the front end 8 of the ferrule and projects from the front end 8 of the ferrule 6 such that its end face 10 is disposed a small distance 9 above the backside of the probe tip holder 2 of the probe tip 1 (FIG. 2). A light beam conducted through the glass fiber exits the glass fiber at the end face 10 adjacent the probe tip but is partially reflected at the glass fiber end face. The light beam part exiting the glass fiber is reflected at the backside of the probe tip 1 or, respectively, the top surface of the probe tip holder 2 back into the glass fiber 7 where it interferes with the light beam part reflected at the glass fiber end face. The interference between the light beam parts reflected from the backside of the probe tip or, respectively, the top surface of the probe tip support member and the light beam part reflected from the glass fiber end face is measured in an inferameter 11 which is shown schematically in FIG. 1 in communication with the glass fiber 7.

The probe tip holder 2 is shown in the embodiment as being a leaf spring which extends from the mounting member 3 and carries the probe tip 1 at its free end so that the end of the leaf spring is resiliently movable relative to the glass fiber end face 10. The mounting member 3 consists for example of Si and the probe tip holder 2 with the probe tip 1 is formed integrally with the probe tip holder 3, that is, it forms, together with the probe tip holder, a unitary component. Upon movement of the probe tip 1 along a sample surface of which a portion is shown in FIGS. 1 and 2 and is indicated by the letter S, the probe tip 1 moves corresponding to the surface topography, i.e. corresponding to the particular surface properties, especially in accordance with the different van der Waals forces or the respective magnetic or electrostatic domain.

For the determination of the movement of the probe tip 1 and the resulting lateral deflection of the probe tip holder 2, the changes in the interference between the light beam part reflected from the glass fiber end face 10 and the light beam part which exits the glass fiber and is reflected from the surface of the probe tip holder 2 are utilized. The changes in the interference are determined by means of the interferometer 11.

The ferrule 6 is mounted in a piezo tube 13 by means of a ferrule holder 12. The piezo tube 13 serves as a piezo scanning element. In the embodiment shown, the ferrule 6 is cylindrical and projects from the ferrule holder 12 by a slip-on length 14 so that the mounting member 3 with the coupling element 5 can be slipped onto the ferrule 6. To facilitate this procedure, the coupling element 5 is tubular and has an axially extending slot 15. The dimensions, that is, the inner diameter of the tubular coupling element 5 and the outer diameter of the ferrule 6, over the slip-on length 14, are so selected that the plug-in structure 4, when slipped onto the ferrule, is force-locked to the ferrule. The slip-on length 14 and the dimensions of the plug-in structure 4 are so adapted to each other that, each time a plug-in structure 4 is slipped onto a ferrule 6, there is always the same distance 9 established between the glass fiber end face 10 and the opposite surface of the tip holder 2. In the embodiment shown, the ferrule holder 12 or the ferrule has a shoulder stop 16 for engagement by the coupling element 5 to achieve such accurate positioning. The distance 9 is between 10 and 20 μm. In the present example, it is 15 μm. The ferrule 6 has an outer diameter of d=2.5 mm.

In order to provide for firm engagement of the plug-in structure 4 with the ferrule 6, the coupling element 5 may include clamping means which permit their clamping onto the ferrule 6 by means of a clamping bolt. However, such clamping means are not shown in the drawings.

By applying electric voltage differences to the piezo material of the piezo-tube 13, the probe tip on the tip holder of the mounting unit is movable relative to the sample surface S for controlling the distance 9 between the light conductor end face 10 and the backside of the probe tip. The probe tip may be used in the scanning probe microscopy for topographic scanning, but it is mainly intended for measuring the van der Waals forces or for determining magnetic or electrostatic domains of a sample surface.

What is claimed is:

1. A mounting arrangement for a probe tip of a scanning force microscope or a SNOM wherein movement of the probe tip while scanning a sample surface is interferometrically determined, said arrangement comprising: a ferrule mounted on a ferrule holder, an optical light conductor extending through said ferrule and having an end with an end face projecting from said ferrule, a mounting structure disposed on said ferrule and including means for engagement with said ferrule and said ferrule holder so as to locate said probe tip in front of said light conductor end face at a predetermined distance therefrom.

2. A mounting arrangement according to claim 1, wherein said mounting structure is attached to said ferrule by a plug-in structure.

3. A mounting arrangement according to claim 2, wherein said plug-in structure includes a force-locking coupling element.

4. A mounting arrangement according to claim 3, wherein said coupling element is an axially slotted tube resiliently engaging said ferrule.

5. A mounting arrangement according to claim 4, wherein said ferrule holder or the ferrule has a shoulder portion around said ferrule which is engaged by said slotted tube for accurately positioning said plug-in structure.

6. A mounting arrangement according to claim 1, wherein said ferrule holder is mounted on a piezo scanning element.

7. A mounting arrangement according to claim 2, wherein said plug-in structure includes a mounting member having a leaf spring-like probe tip holder integrally formed therefrom with said probe tip being disposed at the free end of said probe tip holder so as to be movable relative to said optical light conductor end face.

* * * * *